United States Patent
Khayrallah (10) Patent No.: US 12,119,931 B2
(45) Date of Patent: Oct. 15, 2024

(54) ZIGZAG DECODING OF UPSTREAM-PROCESSED SIGNALS FROM INDEPENDENT RECEIVER SUBARRAYS

(71) Applicant: Telefonaktiebolaget LM Ericsson (publ), Stockholm (SE)

(72) Inventor: Ali S. Khayrallah, Mountain View, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 32 days.

(21) Appl. No.: 17/922,042

(22) PCT Filed: May 4, 2020

(86) PCT No.: PCT/IB2020/054218
§ 371 (c)(1),
(2) Date: Oct. 28, 2022

(87) PCT Pub. No.: WO2021/224655
PCT Pub. Date: Nov. 11, 2021

(65) Prior Publication Data
US 2023/0171026 A1    Jun. 1, 2023

(51) Int. Cl.
*H04L 1/00* (2006.01)
*H04L 1/06* (2006.01)

(52) U.S. Cl.
CPC .......... *H04L 1/0051* (2013.01); *H04L 1/0631* (2013.01)

(58) Field of Classification Search
CPC ..... H04W 88/02; H04W 28/04; H04W 40/00; H04W 72/1263; H04W 84/12;
(Continued)

(56) References Cited

U.S. PATENT DOCUMENTS

| | | | |
|---|---|---|---|
| 7,027,537 B1 | 4/2006 | Cheong et al. | |
| 2004/0223550 A1* | 11/2004 | Hagiwara | H04N 19/436 375/240 |

(Continued)

OTHER PUBLICATIONS

International Search Report and Written Opinion of the International Searching Authority, PCT/IB2020/054218, mailed Feb. 8, 2021, 12 pages.
(Continued)

*Primary Examiner* — Eva Y Puente
(74) *Attorney, Agent, or Firm* — Sage Patent Group (57) ABSTRACT

A method of operating a network node of a communication network includes receiving, by a first decoder of the network node, a first upstream-processed signal associated with an original signal. The method further includes receiving, by a second decoder of the network node, a second upstream-processed signal associated with the original signal. The method further includes determining, by the first decoder, a first downstream-processed signal based on the first upstream-processed signal and outputting, by the first decoder, the first downstream-processed signal. The method further includes responsive to the first decoder outputting the first downstream-processed signal, determining, by the second decoder, a second downstream-processed signal based on the second upstream-processed signal and the first downstream-processed signal and outputting, by the second decoder, the second downstream-processed signal. The method further includes determining a decoded received signal based on outputs from the first decoder and the second decoder.

17 Claims, 6 Drawing Sheets

(58) Field of Classification Search
CPC ....... H04W 24/10; H04W 4/06; H04W 72/02; H03M 7/40; H03M 7/46; H03M 5/145; H03M 13/3905; H03M 13/296; H03M 13/6362; H03M 7/425; H03M 13/1111; H04L 5/0007; H04L 5/0053; H04L 5/0048; H04L 5/0044; H04L 27/2602; H04L 27/2647; H04L 27/2613; H04L 5/0023; H04L 25/03203; H04L 67/1097; H04L 25/03242; H04L 25/03197; H04L 25/03891; H04L 1/0052; H04L 1/0054
USPC ........................................................ 375/340
See application file for complete search history.

(56) References Cited

U.S. PATENT DOCUMENTS

| | | | | |
|---|---|---|---|---|
| 2005/0249423 | A1* | 11/2005 | Huang | H04N 19/127 375/E7.161 |
| 2007/0067696 | A1* | 3/2007 | Bhatt | H03M 13/296 714/758 |
| 2008/0098439 | A1 | 4/2008 | Taura et al. | |
| 2009/0307566 | A1* | 12/2009 | No | H03M 13/1105 714/784 |
| 2010/0158161 | A1 | 6/2010 | Sambhwani et al. | |
| 2011/0038412 | A1* | 2/2011 | Jung | H04N 19/119 375/240.12 |
| 2015/0124908 | A1* | 5/2015 | Luo | H03M 13/1111 375/340 |
| 2017/0187445 | A1* | 6/2017 | Khsiba | H04B 7/08 |
| 2019/0188078 | A1* | 6/2019 | Yu | H03M 13/1154 |

OTHER PUBLICATIONS

Roy S., ed., et al., "Reduced-Complexity Array Receiver With Subarray Selection," 2003 IEEE Pacific Rim Conference on Communications, Computers, and Signal Processing (PACRIM 2003), Victoria, BC, Canada, Aug. 28-30, 2003, (XP010660370) vol. 2, pp. 748-751.

Hochwald, B. M., et al., "Achieving Near-Capacity on a Multiple-Antenna Channel," IEEE Transactions on Communications, vol. 51, No. 3, Mar. 2003, 11 pages.

* cited by examiner

ZIGZAG DECODING OF UPSTREAM-PROCESSED SIGNALS FROM INDEPENDENT RECEIVER SUBARRAYS

CROSS REFERENCE TO RELATED APPLICATIONS

This application is a 35 U.S.C. § 371 national stage application of PCT International Application No. PCT/IB2020/054218 filed on May 4, 2020, the disclosure and content of which is incorporated by reference herein in its entirety.

TECHNICAL FIELD

The present disclosure relates generally to network nodes in wireless communication networks and more specifically to receiver subarray cooperation in downstream receiver processing circuitry.

BACKGROUND

Technology advances, capacity demands, and higher frequency operation have led to a rise in the number of base station receive antennas and radio-near processing. Receiver antenna arrays are partitioned into subarrays, each with their own independent and dedicated processing circuitry.

SUMMARY

According to some embodiments, a method of operating a network node of a communication network is provided. The method includes receiving, by a first decoder of the network node, a first upstream-processed signal associated with an original signal. The method further includes receiving, by a second decoder of the network node, a second upstream-processed signal, associated with the original signal. The method further includes determining, by the first decoder of the network node, a first downstream-processed signal based on the first upstream-processed signal. The method further includes, responsive to determining the first downstream-processed signal, outputting, by the first decoder, the first downstream-processed signal. The method further includes, responsive to the first decoder outputting the first downstream-processed signal, determining, by the second decoder of the network node, a second downstream-processed signal based on the second upstream-processed signal and the first downstream-processed signal. The method further includes, responsive to determining the second downstream-processed signal, outputting, by the second decoder, the second downstream-processed signal. The method further includes determining a decoded received signal based on outputs from the first decoder and the second decoder.

According to other embodiments, a network node operating in a communication network is provided. The network node includes processing circuitry and memory. The memory being coupled to the processing circuitry and having instructions stored therein that are executable by the processing circuitry to cause the network node to perform operations. The operations include receiving, by a first decoder of the network node, a first upstream-processed signal associated with an original signal. The operations further include receiving, by a second decoder of the network node, a second upstream-processed signal, associated with the original signal. The operations further include determining, by the first decoder of the network node, a first downstream-processed signal based on the first upstream-processed signal. The operations further include, responsive to determining the first downstream-processed signal, outputting, by the first decoder, the first downstream-processed signal. The operations further include, responsive to the first decoder outputting the first downstream-processed signal, determining, by the second decoder of the network node, a second downstream-processed signal based on the second upstream-processed signal and the first downstream-processed signal. The operations further include, responsive to determining the second downstream-processed signal, outputting, by the second decoder, the second downstream-processed signal. The operations further include determining a decoded received signal based on outputs from the first decoder and the second decoder.

According to other embodiments, a network node operating in a communication network and adapted to perform operations is provided. The operations include receiving, by a first decoder of the network node, a first upstream-processed signal associated with an original signal. The operations further include receiving, by a second decoder of the network node, a second upstream-processed signal, associated with the original signal. The operations further include determining, by the first decoder of the network node, a first downstream-processed signal based on the first upstream-processed signal. The operations further include, responsive to determining the first downstream-processed signal, outputting, by the first decoder, the first downstream-processed signal. The operations further include, responsive to the first decoder outputting the first downstream-processed signal, determining, by the second decoder of the network node, a second downstream-processed signal based on the second upstream-processed signal and the first downstream-processed signal. The operations further include, responsive to determining the second downstream-processed signal, outputting, by the second decoder, the second downstream-processed signal. The operations further include determining a decoded received signal based on outputs from the first decoder and the second decoder.

According to other embodiments, a computer program is provided. The computer program includes program code to be executed by processing circuitry of a network node operating in a communication network, whereby execution of the program code causes the network node to perform operations. The operations include receiving, by a first decoder of the network node, a first upstream-processed signal associated with an original signal. The operations further include receiving, by a second decoder of the network node, a second upstream-processed signal, associated with the original signal. The operations further include determining, by the first decoder of the network node, a first downstream-processed signal based on the first upstream-processed signal. The operations further include, responsive to determining the first downstream-processed signal, outputting, by the first decoder, the first downstream-processed signal. The operations further include, responsive to the first decoder outputting the first downstream-processed signal, determining, by the second decoder of the network node, a second downstream-processed signal based on the second upstream-processed signal and the first downstream-processed signal. The operations further include, responsive to determining the second downstream-processed signal, outputting, by the second decoder, the second downstream-processed signal. The operations further include determining a decoded received signal based on outputs from the first decoder and the second decoder.

According to other embodiments, a computer program product is provided. The computer program product includes a non-transitory storage medium including program code to be executed by processing circuitry of a network node operating in a communication network, whereby execution of the program code causes the network node to perform operations. The operations include receiving, by a first decoder of the network node, a first upstream-processed signal associated with an original signal. The operations further include receiving, by a second decoder of the network node, a second upstream-processed signal, associated with the original signal. The operations further include determining, by the first decoder of the network node, a first downstream-processed signal based on the first upstream-processed signal. The operations further include, responsive to determining the first downstream-processed signal, outputting, by the first decoder, the first downstream-processed signal. The operations further include, responsive to the first decoder outputting the first downstream-processed signal, determining, by the second decoder of the network node, a second downstream-processed signal based on the second upstream-processed signal and the first downstream-processed signal. The operations further include, responsive to determining the second downstream-processed signal, outputting, by the second decoder, the second downstream-processed signal. The operations further include determining a decoded received signal based on outputs from the first decoder and the second decoder.

In various embodiments described herein, processing architecture and algorithms for a receiver with multiple subarrays is described with parts of the processing occurring at each subarray, and another part occurring downstream fed by the subarrays. A "Zigzag" scheme, which exchanges messages between decoders fed by different subarray signals results in overall receiver performance that approaches that of a full array with unrestricted processing.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Constrained processing per subarray can result in performance loss compared to unconstrained processing with the full array, which may prevent the array investment being fully exploited.

Various embodiments described herein propose a process for subarray cooperation via channel decoding. The receiver architecture limits the information available for processing in each subarray. In some embodiments, a "zigzag" scheme is provided which exchanges messages between decoders fed by different subarray signals. In some examples, the overall receiver performance using the zigzag scheme approaches that of a full array with unrestricted processing. The subarrays produce outcomes including appropriate information, and those outcomes are then further processed together downstream.

Figure 2:
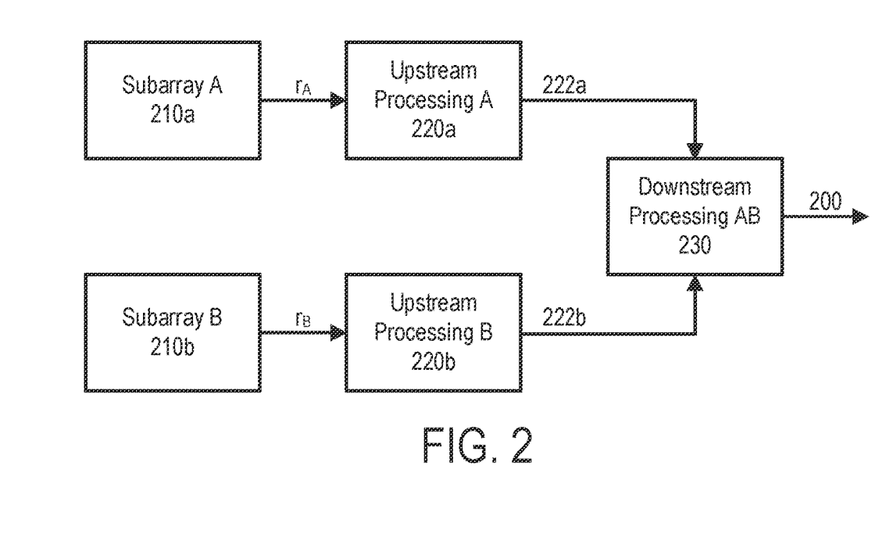
FIG. 2 is a block diagram illustrating an example of a constrained processing structure with two subarrays, two upstream processing circuitry, and one downstream processing in accordance with some embodiments.

Some embodiments do not violate the constrained architecture, in the sense that some embodiments do not require any direct communication among subarrays or any feedback to the subarrays. The zigzag scheme operates downstream from the subarray processing, with its message exchange between decoders being fed by signals from different subarrays. This results in good performance within the constraints of the architecture. The constrained processing structure is shown in FIG. 2. In this example, two subarrays (subarray A 210a and subarray B 210b) each receive a signal ($r_A$ and $r_B$ respectively). Each of subarrays 210a, 210b are associated with upstream processing circuitry (upstream processing A 220a and upstream processing B 220b respectively), which process the received signal into soft values 222a-b (referred to as $L_A^{[0]}$ and $L_B^{[0]}$ in FIG. 6). A downstream processing circuitry 230 determines a decoded received signal 200 based on the soft values 222a-b using a zigzag decoding scheme.

Figure 7:
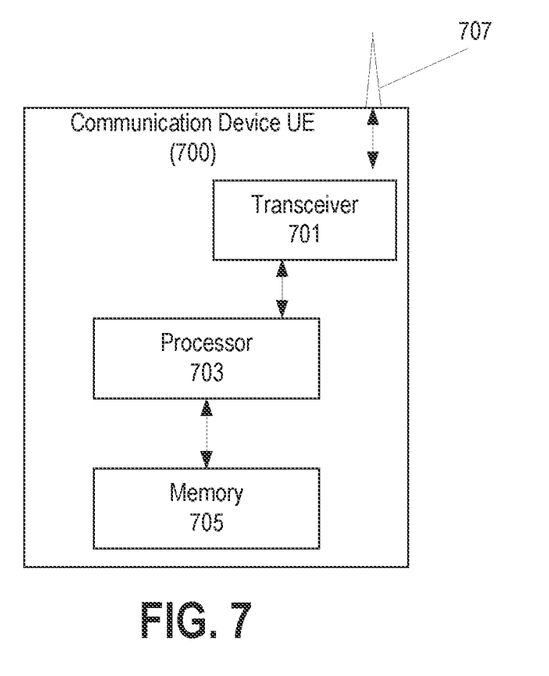
FIG. 7 is a block diagram illustrating an example of a communication device in accordance with some embodiments.

FIG. 7 is a block diagram illustrating elements of a communication device UE 700 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device UE may include an antenna 707, and transceiver circuitry 701 including a transmitter and a receiver configured to provide uplink and downlink radio communications with a base station(s), also referred to as a RAN node) of a radio access network. Communication device UE may also include processing circuitry 703 coupled to the transceiver circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that separate memory circuitry is not required. Communication device UE may also include an interface (such as a user interface) coupled with processing circuitry 703, and/or communication device UE may be incorporated in a vehicle.

As discussed herein, operations of communication device UE may be performed by processing circuitry 703 and/or transceiver circuitry 701. For example, processing circuitry 703 may control transceiver circuitry 701 to transmit communications through transceiver circuitry 701 over a radio interface to a radio access network node (also referred to as a base station) and/or to receive communications through transceiver circuitry 701 from a RAN node over a radio interface. Moreover, modules may be stored in memory circuitry 705, and these modules may provide instructions so that when instructions of a module are executed by processing circuitry 703, processing circuitry 703 performs respective operations.

Figure 8:
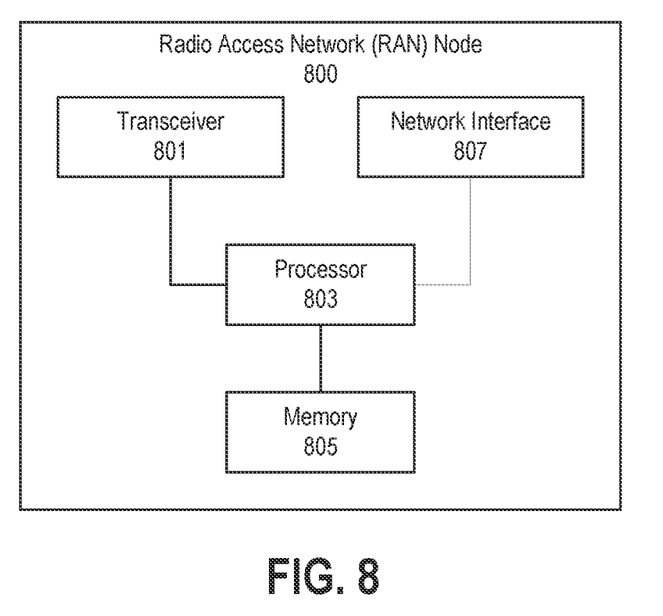
FIG. 8 is a block diagram illustrating an example of a radio access network ("RAN") node in accordance with some embodiments.

FIG. 8 is a block diagram illustrating elements of a radio access network RAN node 800 (also referred to as a network node, base station, eNodeB/eNB (Evolved Node B), gNodeB/gNB, etc.) of a Radio Access Network (RAN) configured to provide cellular communication according to embodiments of inventive concepts. As shown, the RAN node may include transceiver circuitry 801 (also referred to as a transceiver) including a transmitter and a receiver configured to provide uplink and downlink radio communications with mobile terminals. The RAN node may include network interface circuitry 807 (also referred to as a network interface) configured to provide communications with other nodes (e.g., with other base stations) of the RAN and/or core network CN. The network node may also include processing circuitry 803 (also referred to as a processor, e.g., corresponding to processing circuitry 4170) coupled to the transceiver circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the RAN node may be performed by processing circuitry 803, network interface 807, and/or transceiver 801. For example, processing circuitry 803 may control transceiver 801 to transmit downlink communications through transceiver 801 over a radio interface to one or more mobile terminals UEs and/or to receive uplink communications through transceiver 801 from one or more mobile terminals UEs over a radio interface. Similarly, processing circuitry 803 may control network interface 807 to transmit communications through network interface 807 to one or more other network nodes and/or to receive communications through network interface from one or more other network nodes. Moreover, modules may be stored in memory 805, and these modules may provide instructions so that when instructions of a module are executed by processing circuitry 803, processing circuitry 803 performs respective operations.

According to some other embodiments, a network node may be implemented as a core network CN node without a wireless transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 9:
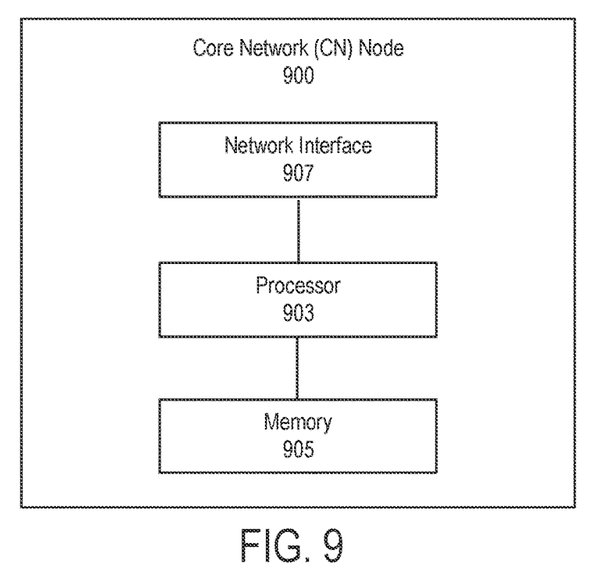
FIG. 9 is a block diagram illustrating an example of a core network ("CN") node in accordance with some embodiments.

FIG. 9 is a block diagram illustrating elements of a core network CN node 900 (e.g., an Session Management Function ("SMF") node, an Access and Mobility Management Function ("AMF") node, etc.) of a communication network configured to provide cellular communication according to embodiments of inventive concepts. As shown, the CN node may include network interface circuitry 907 (also referred to as a network interface) configured to provide communications with other nodes of the core network and/or the radio access network RAN. The CN node may also include a processing circuitry 903 (also referred to as a processor) coupled to the network interface circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the CN node may be performed by processing circuitry 903 and/or network interface circuitry 907. For example, processing circuitry 903 may control network interface circuitry 907 to transmit communications through network interface circuitry 907 to one or more other network nodes and/or to receive communications through network interface circuitry from one or more other network nodes. Moreover, modules may be stored in memory 905, and these modules may provide instructions so that when instructions of a module are executed by processing circuitry 903, processing circuitry 903 performs respective operations.

Figure 10:
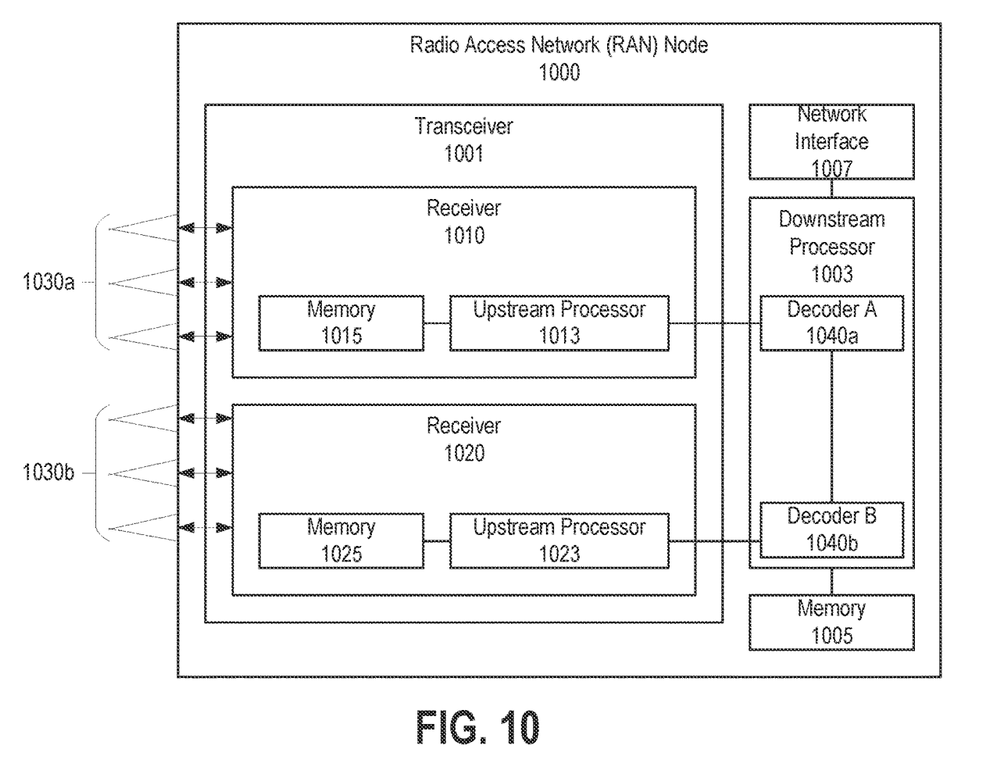
FIG. 10 is a block diagram illustrating an example of a RAN node with antenna subarrays and upstream processors in accordance with some embodiments.

FIG. 10 is a block diagram illustrating elements of another radio access network, RAN, node 1000 (also referred to as a network node, base station, eNodeB/eNB, gNodeB/gNB, etc.) of a Radio Access Network (RAN) configured to provide cellular communication according to embodiments of inventive concepts. As shown, the RAN node may include transceiver circuitry 1001 (also referred to as a transceiver) including a transmitter and a receiver configured to provide uplink and downlink radio communications with mobile terminals. Here, transceiver 1001 is depicted as including a pair up receivers 1010, 1020 each with their own upstream processing circuitry 1013, 1023 (also referred to as upstream processors) and corresponding memory circuitry 1015, 1025 (also referred to as memory). The memory circuitry 1015, 1025 may include computer readable program code that when executed by the upstream processing circuitry 1013, 1023 causes the upstream processing circuitry to perform operations according to embodiments disclosed herein. For example, upstream processing circuitry 1013, 1023 may transform receive signal domain representations of signals received via antenna subarrays 1030a, 1030b into transmit domain representations. According to other embodiments, upstream processing circuitry 1013, 1023 may be defined to include memory so that a separate memory circuitry is not required. The RAN node 1000 may include or be coupled to an array of antenna that are made up of one or more antenna subarrays. Here, receiver 1010 is associated with antenna subarray 1030a and receiver 1020 is associated with antenna subarray 1030b.

The RAN node may include network interface circuitry 1007 (also referred to as a network interface) configured to provide communications with other nodes (e.g., with other base stations) of the RAN and/or core network CN. The network node may also include downstream processing circuitry 1003 (also referred to as a processor, e.g., corresponding to processing circuitry 4170) coupled to the transceiver circuitry, and memory circuitry 1005 (also referred to as memory) coupled to the processing circuitry. The memory circuitry 1005 may include computer readable program code that when executed by the downstream processing circuitry 1003 causes the downstream processing circuitry 1003 to perform operations according to embodiments disclosed herein. For example, downstream processing circuitry may combine outputs from receivers 1010, 1020. According to other embodiments, downstream processing circuitry 1003 may be defined to include memory so that a separate memory circuitry is not required. Modules may be stored in memory 1005, and these modules may provide instructions so that when instructions of a module are executed by processing circuitry 1003, 1013, 1023, processing circuitry 1003, 1013, 1023, performs respective operations. In additional or alternative embodiments, another network node (e.g., a UE or a CN node) may have multiple receivers similar to receiver 1010, 1020 that are each associated with an antenna subarray and a downstream processor for performing similar operations as RAN node 1000.

In some embodiments, a MIMO system is provided in which the transmitter sends M streams and the receiver has N antennas. In some examples, linear receiver techniques are used which assume that N≥M. Furthermore, since the antennas are split into subsets, the size of each subset ≥M. The following disclosure describes embodiments in which the array is split into two subsets of equal size (N/2) and that N/2≥M. However, the subarrays may be of inequal size and the array may be divided into any number of subarrays.

In some embodiments, a system equation for describing a vector, r, of received symbols is given by $$r=Hs+w$$

where s is a vector of M symbols from a modulation constellation (e.g., QAM) and H is a channel matrix of size N×M. In some examples, the channels have an average energy of one. The total noise, w, can include an interference signal plus a white noise signal, $$w=H_i s_i +v$$

The total noise covariance of size N×N can be written as $$R_w = E_i H_i H_i^H + E_v I$$

where $E_i$ and $E_v$ are the interference and white noise energy, respectively. Channel parameters can be estimated from the received signal, aided by pilots symbols embedded in transmitted signals.

A maximum likelihood (ML) demodulator can search for a candidate vector ŝ for s that minimizes the metric:

$$m(\hat{s})=(r-H\hat{s})^H R_w^{-1}(r-H\hat{s})$$

This may require a full search, which can become infeasible for a large constellation or a large number of streams.

Incorporating the interference into the metric enables the receiver to suppress interference. This can greatly enhance performance in scenarios with large interference with high strong color (as reflected in large values of non-diagonal elements in $R_w$). In some embodiments, another version of this demodulator ignores interference by approximating $R_w$ as a diagonal matrix. Then fewer parameters need to be estimated and also the complexity of matrix operations such as inverses would be reduced.

In some embodiments, the ML demodulator is implemented as a sphere decoder (SD). In additional or alternative embodiments, any demodulator capable of producing modem soft values may be used. A SD can search among the candidate transmit signals š within a progressively shrinking sphere centered at an initial guess š. Overall, the SD can be computationally efficient while remaining equivalent to the ML demodulator. Various shortcuts can further speed up the SD, with corresponding performance penalties.

A receive signal domain representation can be transformed to a transmit domain representation using a left inverse F of H, of size M×N, given by:

$$F=(H^H R_w^{-1} H)^{-1} H^H R_w^{-1}$$

The received signal, r, can be transformed into $$\tilde{s}=Fr$$

where š is the ML estimate of s, if s were a Gaussian vector. Since s belongs to a discrete set, š can be an initial guess for s. The candidates ŝ for the transmitted symbol vector can be searched in the neighborhood of š for the final answer. š can be written as $$\tilde{s}=s+x$$

where x=Fw with covariance:

$$R_x = F R_w F^H$$

of size M×M, which can be written as $$R_x = (H^H R_w^{-1} H)^{-1}$$

In some embodiments, given š, the SD finds the best candidate using a modified metric given by:

$$n(\hat{s})=(\tilde{s}-\hat{s})^H R_x^{-1}(\tilde{s}-\hat{s})$$

The SD can exploit the Hermitian (complex symmetric) property of the covariance matrix. It can perform a Cholesky decomposition, which computes a triangular "root" matrix K such that:

$$K^H K = R_x^{-1}$$

The triangular property can enable the solution of linear systems by back substitution. It is also an ingredient in facilitating the restriction of the search to a sphere. Finding the best candidate using n(ŝ) under the sphere restriction can be referred to as the sphere restricted search.

In some embodiments, in addition to the modulation symbols, a demapper can use the metrics of the SD to produce hard and soft values for the modem bits that map into the modulation symbols. The hard or soft bit values can be fed to the channel decoder.

Figure 1:
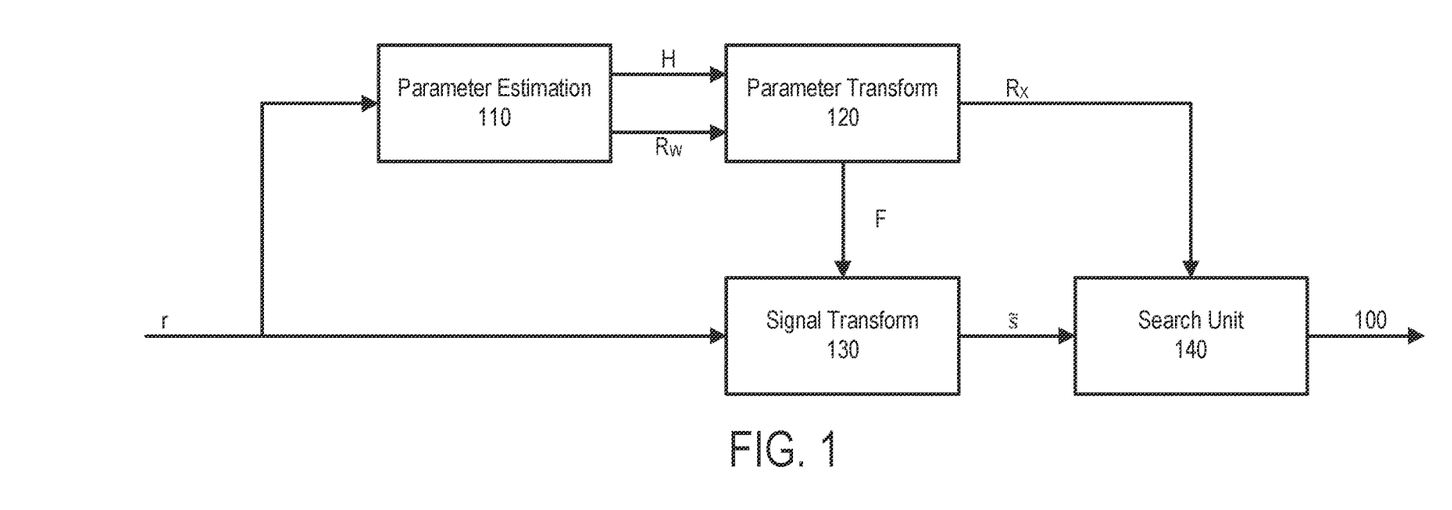
FIG. 1 is a block diagram illustrating an example of a receiver structure with parameter estimation, parameter transform, signal transform, and a search unit.

The baseline demodulation process is shown in FIG. 1 that includes parameter estimation 110, the parameter transform 120 to obtain F and $R_x$, the signal transform 130 from the receive domain to the transmit domain, and a search unit 140, which outputs a decoded received signal 100.

In some embodiments, the receive antennas can be split into two subsets, A and B, of equal size N/2, which represent two subarrays. Without loss of generality, the subsets can be assumed to be contiguous in the vector notation. The received signal and the channel can be split accordingly:

$$r = \begin{bmatrix} r_A \\ r_B \end{bmatrix}$$

$$H = \begin{bmatrix} H_A \\ H_B \end{bmatrix}$$

$$w = \begin{bmatrix} w_A \\ w_B \end{bmatrix}$$

The individual subarray receivers observe their own partial received signals:

$$r_A = H_A s + w_A$$

$$r_B = H_B s + w_B$$

The total covariance can be rewritten as $$R_w = \begin{bmatrix} R_{wA} & Q_{wAB} \\ Q_{wAB}^H & R_{wB} \end{bmatrix}$$

where $R_{wA}$ and $R_{wB}$ are the separate covariances of $w_A$ and $w_B$ respectively, and $Q_{wAB}$ is the cross covariance of $w_A$ and $w_B$.

Subarray receivers for A and B following the same approach as before, with a transform to the signal domain. That is, A observes $r_A$ and produces $$\tilde{s}_A = (H_A^H R_{wA}^{-1} H_A)^{-1} H_A^H R_{wA}^{-1} r_A = F_A r_A = s + F_A w_A = s + x_A$$

where the previous notation has been modified to refer to subarray A. The covariance of $x_A$ can be written as $$R_{xA} = F_A R_{wA} F_A^H$$

Figure 3:
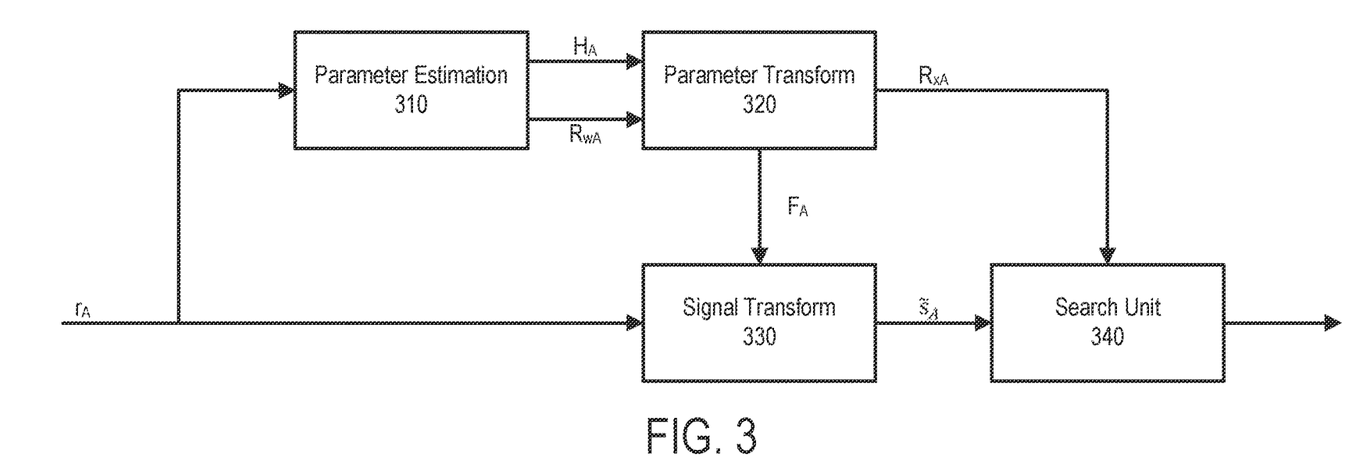
FIG. 3 is a block diagram illustrating an example of a subarray processing structure for a first receive signal, $r_A$, in accordance with some embodiments.

FIG. 3 illustrates the demodulator structure of subarray A. The signal, $r_A$, received by subarray A can be input to a parameter estimation module 310 and a signal transform module 330. The parameter estimation module 310 can output $H_A$ and $R_{wA}$ to a parameter transform module 320, which can output $F_A$ to the signal transform module 330 and $R_{xA}$ to the search unit 340. The signal transform module 330 can then output $\tilde{s}_A$ to the search unit 340. The search unit 340 can search (e.g., sphere restricted search) for the best candidate around $\tilde{s}_A$ with the appropriate parameters. The output of the search unit 340 includes modulation symbols as well as modem bit soft values denoted $L_A^{[0]}$ to be fed to a first downstream decoder (e.g., Decoder A 640a of FIG. 6) of the downstream processing circuitry.

Figure 4:
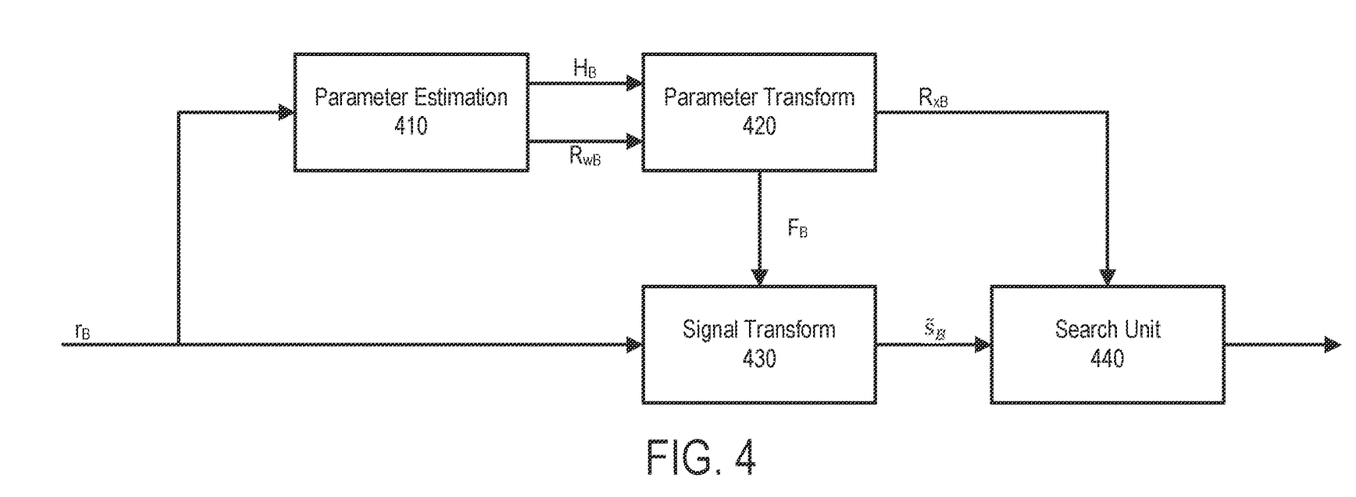
FIG. 4 is a block diagram illustrating an example of a subarray processing structure for a second receive signal, $r_B$, in accordance with some embodiments.

Similarly, B observes $r_B$ and goes through the same steps to produce $$\tilde{s}_B = s + F_B w_B = s + x_B$$

using the matrices $F_B$ and $R_{xB}$ (just replacing subscript A with B). The structure of the subarray processing is shown in FIG. 4 for subarray B. The signal, $r_B$, received by subarray B can be input to a parameter estimation module 410 and a signal transform module 430. The parameter estimation module 410 can output $H_B$ and $R_{wB}$ to a parameter transform module 420, which can output $F_B$ to the signal transform module 430 and $R_{xB}$ to the search unit 440. The signal transform module 530 can then output $\tilde{s}_B$ to the search unit 440. The search unit 440 can search (e.g., sphere restricted search) around $\tilde{s}_B$ with the appropriate parameters. The output of the search unit 440 includes modulation symbols as well as modem bit soft values denoted $L_B^{[0]}$ to be fed to a second downstream decoder (e.g., Decoder B 640b of FIG. 6) of the downstream processing circuitry.

Figure 5:
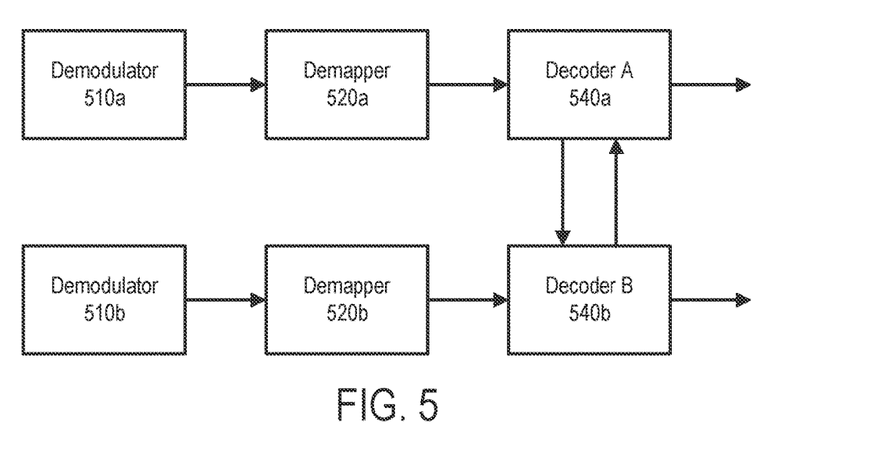
FIG. 5 is a block diagram illustrating an example of different domains of a receiver in accordance with some embodiments.

The performance of the individual subarray demodulators will be limited by the constraints, since each has only access to its own subarray signal. Various embodiments herein describe how to use feedback from the decoder in downstream processing. FIG. 5 illustrates an example in which demodulators 510a, 510b of subarrays A and B provide signals to demappers 520a, 520b respectively, which output modem soft values. The modem soft values from the demappers 520a, 520b of are fed to separate decoders 540a, 540b, and there is information exchange between the decoders.

Figure 6:
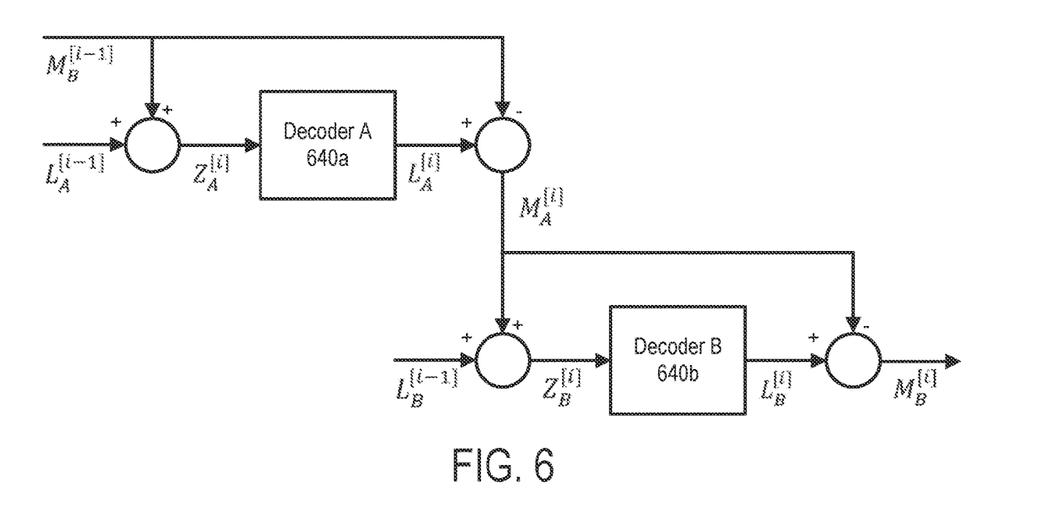
FIG. 6 is a block diagram illustrating an example of a downstream processing structure for a first decoded upstream-processed signal and a second decoded upstream-processed signal in accordance with some embodiments.

In some embodiments, the information exchange between decoders in downstream processing circuitry is considered a "Zigzag" structure, where in each stage, Decoder A operates first, then Decoder B. FIG. 6 illustrates stage i of a zigzag processing between two decoders 640a, 640b of two upstream-processed signals from two independent subarrays.

For Decoder A 640a, $L_A^{[i-1]}$ represents its output soft values from stage i−1, and $M_B^{[i-1]}$ represents the message from Decoder B 640b at Stage i−1. The input to Decoder A 640a is $$Z_A^{[i]} = L_A^{[i-1]} + M_B^{[i-1]}$$

The output soft values are represented by $L_A^{[i]}$. The message to Decoder B 640b is given by $$M_A^{[i]} = L_A^{[i]} - M_B^{[i-1]}$$

For Decoder B 640b, $L_B^{[i-1]}$ represents its output soft values from stage i−1, and the input is $$Z_B^{[i]} = L_B^{[i-1]} + M_A^{[i]}$$

The output soft values are represented by $L_B^{[i]}$. The message to Decoder A 640a at Stage i+1 is given by $$M_B^{[i]} = L_B^{[i]} - M_A^{[i]}$$

The Zigzag scheme is initialized at stage 1 with $L_A^{[0]}$ and $L_B^{[0]}$ set to the modem bit soft values from their respective SD. In addition, the message $M_B^{[0]}$ from Decoder B 640b is set to 0.

In some embodiments, the number of stages v of the Zigzag scheme can be fixed to achieve a desired tradeoff of complexity and performance, e.g. v=5. In the last stage, $L_B^{[v]}$ can be considered to be the output of the Zigzag scheme and $M_B^{[v]}$ may not be computed since there is no upcoming stage v+1.

In additional or alternative embodiments, an alternative to a fixed number of stages is used to stop the Zigzag scheme based on the outcome. In one example if the encoding scheme includes a parity check code, e.g. a CRC, then the Zigzag scheme stops if in some stage i the hard values based on $L_B^{[i]}$ out of Decoder B satisfy the parity check. The process can be stopped and v can be set to i. In additional or alternative examples, the Zigzag scheme can be stopped based on whether the outcome stops changing from stage to stage. In particular, if $L_B^{[i]}$ out of Decoder B is very close to $L_B^{[i-1]}$ from the previous stage. Then the process can be stopped and v set to i.

The Zigzag scheme improves performance by exchanging messages between decoders. The rationale for the subtraction of $M_B^{[i-1]}$ at the output of Decoder A 640a is to match its addition at the input and to prevent accumulation over multiple stages (similarly for the subtraction of $M_A^{[i]}$).

In some embodiments, the soft values $L_A^{[0]}$ and $L_B^{[0]}$ are jointly processed downstream in a decoding scheme.

Various embodiments herein describe how to use feedback from the decoder in downstream processing. From the example in FIG. 5, the modem soft values from the demappers 520a, 520b of subarrays A and B are fed to separate decoders 540a, 540b, and there is information exchange between the decoders, as shown in FIG. 5. The Zigzag scheme assumes that the component decoders accept and produce modem bit soft values. Most modern channel codes have decoders capable of accepting modem bit soft values as input. This includes convolutional codes, turbo codes, LDPC codes, polar codes etc. Those decoders produce modem bit soft values during their normal internal process, or can produce them as a byproduct with some further computations.

Figure 11:
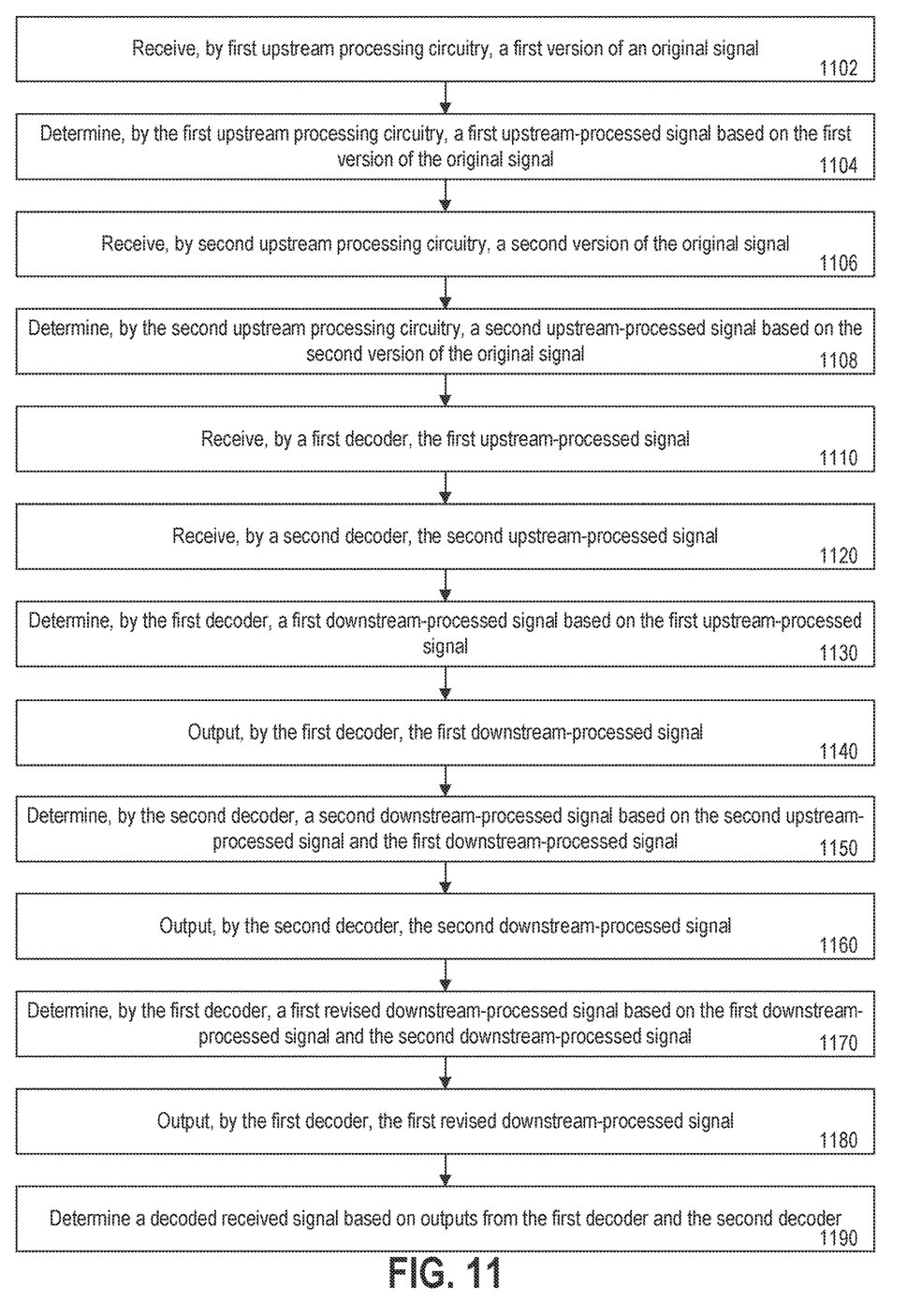
FIG. 11 is a flow chart illustrating an example of a process performed by a network node in accordance with some embodiments.

Operations of a network node will now be discussed with reference to the flow charts of FIG. 11 according to some embodiments of inventive concepts. FIG. 11 will be described below as being performed by RAN node 1000 (implemented using the structure of the block diagram of FIG. 10). For example, modules may be stored in memory 1005 of FIG. 10, and these modules may provide instructions so that when the instructions of a module are executed by respective RAN node processing circuitry 1003, processing circuitry 1003 performs respective operations of the flow charts. However, the at least a portion of the operations may be performed by any downstream processing circuitry, downstream receiver, or network node.

FIG. 11 illustrates examples of operations performed by a RAN node 1000 in accordance with some embodiments.

At block 1102, first upstream processing circuitry 1013 receives, via antenna subarray 1030a, a first version of an original signal. In some embodiments, the first version of the original signal is a first receive signal domain representation of the original signal.

At block 1104, first upstream processing circuitry 1013 determines a first upstream-processed signal based on the first version of the original signal. In some embodiments, the first upstream-processed signal is a transmit domain representation of a first receive signal domain version of the original signal received at a first receiver 1010 in the network node 1000. In additional or alternative embodiments, determining the first processed signal includes transforming the first receive signal domain representation of the original signal to a first transmit domain representation of the original signal.

At block 1106, second upstream processing circuitry 1023 receives, via antenna subarray 1030b, a second version of the original signal. In some embodiments, the second version of the original signal is a second receive signal domain representation of the original signal.

At block 1108, second upstream processing circuitry 1023 determines a second upstream-processed signal based on the second version of the original signal. In some embodiments, the second upstream-processed signal is a transmit domain representation of a second receive signal domain version of the original signal received at a second receiver 1020 in the network node 1000. In additional or alternative embodiments, determining the second processed signal includes transforming a second receive signal domain representation of the original signal to a second transmit domain representation of the original signal.

At block 1110, first decoder 1040a, receives the first upstream-processed signal. In some embodiments, receiving the first upstream-processed signal includes receiving the first upstream-processed signal from the first upstream processing circuitry 1013, which is part of a first receiver 1010 of the network node 1000. In additional or alternative embodiments, receiving the first upstream-processed signal includes receiving the first upstream-processed signal from a remote receiver in another network node.

At block 1120, second decoder 1040b, receives the second upstream-processed signal. In some embodiments, receiving the second upstream-processed signal includes receiving the second upstream-processed signal from the second upstream processing circuitry 1023, which is part of a second receiver 1020 of the network node 1000. In additional or alternative embodiments, receiving the second upstream-processed signal includes receiving the second upstream-processed signal from a remote receiver in another network node.

At block 1130, first decoder 1040a determines a first downstream-processed signal based on the first upstream-processed signal. In some embodiments, the first decoder is a maximum likelihood process decoder. Determining the first downstream-processed signal can include performing, by the first decoder, a maximum likelihood process on the first upstream-processed signal.

At block 1140, first decoder 1040a outputs the first downstream-processed signal. At block 1150, second decoder 1040b determines a second downstream-processed signal based on the second upstream-processed signal and the first downstream-processed signal. Determining the second downstream-processed signal can include decoding, by the second decoder, an input based on the second upstream-processed signal and the first downstream-processed signal. At block 1160, second decoder 1040b outputs the second downstream-processed signal.

At block 1170, first decoder 1040a determines a first revised downstream-processed signal based on the first downstream-processed signal and the second downstream-processed signal. At block 1180, first decoder 1040a outputs the first revised downstream-processed signal.

At block 1190, downstream processing circuitry 1003 determines a decoded received signal based on outputs from the first decoder and the second decoder. In some embodiments, determining the decoded received signal based on outputs from the first decoder and the second decoder includes iteratively determining the decoded received signal by responsive to a change in an output of the second decoder, outputting, by the first decoder, a revised first downstream-processed signal based on the output of the first decoder and the output of the second decoder; and responsive to a change in an output of the second decoder, outputting, by the second decoder, a revised second downstream-processed signal based on the output of the second decoder and the output of the first decoder.

In some embodiments, the communication network is a new radio, NR, network. Various operations of FIG. 11 may be optional with respect to some embodiments of network nodes and related methods.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a network node of a communication network, the method comprising:
   receiving, by a first decoder of the network node, a first upstream-processed signal associated with an original signal;
   receiving, by a second decoder of the network node, a second upstream-processed signal, associated with the original signal;
   determining, by the first decoder of the network node, a first downstream-processed signal based on the first upstream-processed signal;
   responsive to determining the first downstream-processed signal, outputting, by the first decoder, the first downstream-processed signal;
   responsive to the first decoder outputting the first downstream-processed signal, determining, by the second decoder of the network node, a second downstream-processed signal based on the second upstream-processed signal and the first downstream-processed signal;
   responsive to determining the second downstream-processed signal, outputting, by the second decoder, the second downstream-processed signal;
   determining a decoded received signal based on outputs from the first decoder and the second decoder;
   responsive to the second decoder outputting the second downstream-processed signal, determining, by the first decoder, a first revised downstream-processed signal based on the first downstream-processed signal and second downstream-processed signal; and
   responsive to determining the first revised downstream-processed signal, outputting, by the first decoder, the first revised downstream-processed signal.

2. The method of claim 1, wherein determining the decoded received signal based on outputs from the first decoder and the second decoder comprises iteratively determining the decoded received signal by:
   responsive to a change in an output of the second decoder, outputting, by the first decoder, a revised first downstream-processed signal based on the output of the first decoder and the output of the second decoder; and
   responsive to a change in an output of the second decoder, outputting, by the second decoder, a revised second downstream-processed signal based on the output of the second decoder and the output of the first decoder.

3. The method of claim 1, wherein the network node is associated with an array of antennas,
   wherein receiving the first upstream-processed signal comprises receiving the first upstream-processed signal from a first receiver associated with a first subarray of the array of antennas, and
   wherein receiving the second upstream-processed signal comprises receiving the second upstream-processed signal from a second receiver associated with a second subarray of the array of antennas, the second subarray being distinct from the first subarray.

4. The method of claim 1, wherein the first upstream-processed signal is a transmit domain representation of a first receive signal domain version of the original signal received at a first receiver in the network node, and
   wherein the second upstream-processed signal is a transmit domain representation of a second receive signal domain version of the original signal received at a second receiver in the network node.

5. The method of claim 1, wherein the network node comprises an antenna array, a first receiver associated with a first subarray of the antenna array, and a second receiver associated with a second subarray of the antenna array that is independent of the first subarray, the method further comprising:
   receiving, by the first receiver, a first version of the original signal via the first subarray of the antenna array;
   determining, by the first receiver, the first upstream-processed signal based on the first version of the original signal;
   receiving, by the second receiver, a second version of the original signal via the second subarray of the antenna array;
   determining, by the second receiver, the second upstream-processed signal based on the second version of the original signal.

6. The method of claim 5, wherein the first version of the original signal is a first receive signal domain representation of the original signal,
   wherein the second version of the original signal is a second receive signal domain representation of the original signal,
   wherein determining the first processed signal comprises transforming the first receive signal domain representation of the original signal to a first transmit domain representation of the original signal, and
   wherein determining the second processed signal comprises transforming a second receive signal domain representation of the original signal to a second transmit domain representation of the original signal.

7. A network node operating in a communication network, the network node comprising:
   processing circuitry; and
   memory coupled to the processing circuitry and having instructions stored therein that are executable by the processing circuitry to cause the network node to perform operations, the operations comprising:
      receiving, by a first decoder of the network node, a first upstream-processed signal associated with an original signal;
      receiving, by a second decoder of the network node, a second upstream-processed signal, associated with the original signal;
      determining, by the first decoder of the network node, a first downstream-processed signal based on the first upstream-processed signal;
      responsive to determining the first downstream-processed signal, outputting, by the first decoder, the first downstream-processed signal;
      responsive to the first decoder outputting the first downstream-processed signal, determining, by the second decoder of the network node, a second downstream-processed signal based on the second upstream-processed signal and the first downstream-processed signal;

responsive to determining the second downstream-processed signal, outputting, by the second decoder, the second downstream-processed signal;

determining a decoded received signal based on outputs from the first decoder and the second decoder, responsive to the second decoder outputting the second downstream-processed signal, determining, by the first decoder, a first revised downstream-processed signal based on the first downstream-processed signal and second downstream-processed signal; and responsive to determining the first revised downstream-processed signal, outputting, by the first decoder, the first revised downstream-processed signal.

8. The network node of claim 7, wherein determining the decoded received signal based on outputs from the first decoder and the second decoder comprises iteratively determining the decoded received signal by:

responsive to a change in an output of the second decoder, outputting, by the first decoder, a revised first downstream-processed signal based on the output of the first decoder and the output of the second decoder; and responsive to a change in an output of the second decoder, outputting, by the second decoder, a revised second downstream-processed signal based on the output of the second decoder and the output of the first decoder.

9. The network node of claim 7, wherein the network node is associated with an array of antennas, wherein receiving the first upstream-processed signal comprises receiving the first upstream-processed signal from a first receiver associated with a first subarray of the array of antennas, and wherein receiving the second upstream-processed signal comprises receiving the second upstream-processed signal from a second receiver associated with a second subarray of the array of antennas, the second subarray being distinct from the first subarray.

10. The network node of claim 7, wherein the first upstream-processed signal is a transmit domain representation of a first receive signal domain version of the original signal received at a first receiver in the network node, and wherein the second upstream-processed signal is a transmit domain representation of a second receive signal domain version of the original signal received at a second receiver in the network node.

11. The network node of claim 7, further comprising:

an array of antennas comprising a first subarray of antennas and a second subarray of antennas, the second subarray being distinct from the first subarray;

a first receiver coupled to the first subarray of antennas and comprising:

first upstream processing circuitry; and first memory coupled to the first upstream processing circuitry and having instructions stored therein that are executable by the first upstream processing circuitry to cause the first receiver to perform first upstream operations, the first upstream operations comprising:

receiving, by the first receiver in the network node via the first subarray of antennas, a first version of the original signal; and determining, by the first receiver in the network node, the first upstream-processed signal based on the first version of the original signal; and a second receiver coupled to the second subarray of antennas and comprising:

second upstream processing circuitry; and second memory coupled to the second upstream processing circuitry and having instructions stored therein that are executable by the second upstream processing circuitry to cause the second receiver to perform second upstream operations, the second upstream operations comprising:

receiving, by the second receiver in the network node via the second subarray of antennas, a second version of the original signal; and determining, by the second receiver in the network node, the second upstream-processed signal based on the second version of the original signal.

12. The network node of claim 11, wherein the first version of the original signal is a first receive signal domain representation of the original signal, wherein the second version of the original signal is a second receive signal domain representation of the original signal, wherein determining the first processed signal comprises transforming the first receive signal domain representation of the original signal to a first transmit domain representation of the original signal, and wherein determining the second processed signal comprises transforming a second receive signal domain representation of the original signal to a second transmit domain representation of the original signal.

13. A computer program product comprising a non-transitory computer-readable storage medium, the computer-readable storage medium having computer-executable instructions configured to cause a wireless device to perform operations when the computer-executable instructions are executed on a processor comprised in the wireless device, the operations comprising:

receiving, by a first decoder of the network node, a first upstream-processed signal associated with an original signal;

receiving, by a second decoder of the network node, a second upstream-processed signal, associated with the original signal;

determining, by the first decoder of the network node, a first downstream-processed signal based on the first upstream-processed signal;

responsive to determining the first downstream-processed signal, outputting, by the first decoder, the first downstream-processed signal;

responsive to the first decoder outputting the first downstream-processed signal, determining, by the second decoder of the network node, a second downstream-processed signal based on the second upstream-processed signal and the first downstream-processed signal;

responsive to determining the second downstream-processed signal, outputting, by the second decoder, the second downstream-processed signal;

determining a decoded received signal based on outputs from the first decoder and the second decoder, responsive to the second decoder outputting the second downstream-processed signal, determining, by the first decoder, a first revised downstream-processed signal based on the first downstream-processed signal and second downstream-processed signal; and responsive to determining the first revised downstream-processed signal, outputting, by the first decoder, the first revised downstream-processed signal.

14. The computer program product of claim 13, wherein determining the decoded received signal based on outputs from the first decoder and the second decoder comprises iteratively determining the decoded received signal by:

responsive to a change in an output of the second decoder, outputting, by the first decoder, a revised first downstream-processed signal based on the output of the first decoder and the output of the second decoder; and responsive to a change in an output of the second decoder, outputting, by the second decoder, a revised second downstream-processed signal based on the output of the second decoder and the output of the first decoder.

15. The computer program product of claim 13, wherein the network node is associated with an array of antennas,
    wherein receiving the first upstream-processed signal comprises receiving the first upstream-processed signal from a first receiver associated with a first subarray of the array of antennas, and
    wherein receiving the second upstream-processed signal comprises receiving the second upstream-processed signal from a second receiver associated with a second subarray of the array of antennas, the second subarray being distinct from the first subarray.

16. The computer program product of claim 13, wherein the first upstream-processed signal is a transmit domain representation of a first receive signal domain version of the original signal received at a first receiver in the network node, and
    wherein the second upstream-processed signal is a transmit domain representation of a second receive signal domain version of the original signal received at a second receiver in the network node.

17. The computer program product of claim 13, wherein the network node comprises an antenna array, a first receiver associated with a first subarray of the antenna array, and a second receiver associated with a second subarray of the antenna array that is independent of the first subarray, the method further comprising:
    receiving, by the first receiver, a first version of the original signal via the first subarray of the antenna array;
    determining, by the first receiver, the first upstream-processed signal based on the first version of the original signal;
    receiving, by the second receiver, a second version of the original signal via the second subarray of the antenna array;
    determining, by the second receiver, the second upstream-processed signal based on the second version of the original signal.

* * * * *